C. D. McCONNELL.
COMPASS FOR AUTOMOBILES.
APPLICATION FILED FEB. 15, 1918.
1,317,086.
Patented Sept. 23, 1919.
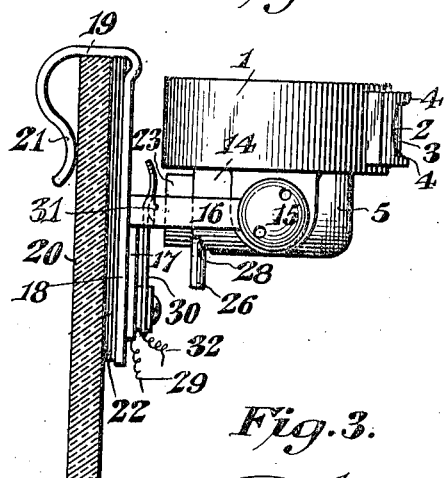
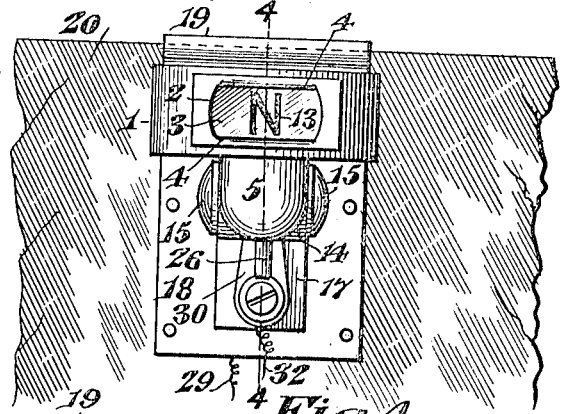
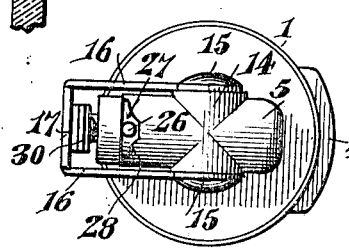
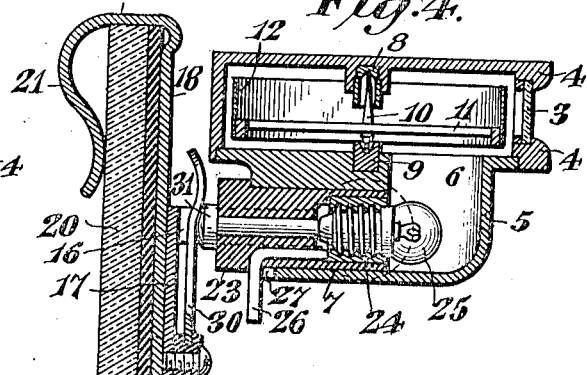
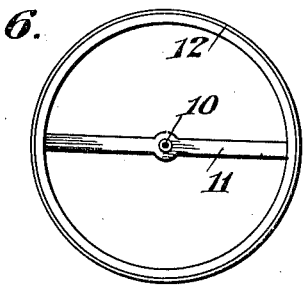
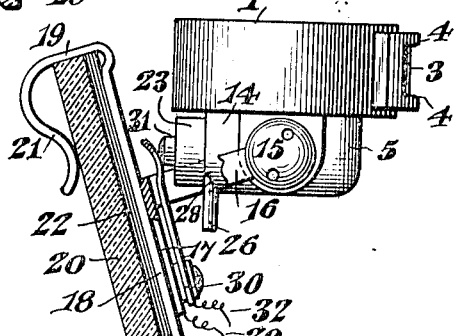
WITNESSES
Jas. K. McCathran
H. T. Chapman
INVENTOR
Charles D. McConnell,
BY
ATTORNEY

UNITED STATES PATENT OFFICE.

CHARLES D. McCONNELL, OF OSKALOOSA, IOWA.

COMPASS FOR AUTOMOBILES.

1,317,086.  Specification of Letters Patent.  Patented Sept. 23, 1919.

Application filed February 15, 1918. Serial No. 217,431.

*To all whom it may concern:*

Be it known that I, CHARLES D. McCONNELL, a citizen of the United States, residing at Oskaloosa, in the county of Mahaska and State of Iowa, have invented a new and useful Compass for Automobiles, of which the following is a specification.

This invention has reference to compasses for use on automobiles and its object is to provide a device which may be applied to the wind shield or other convenient part of the vehicle within ready view of the driver of the vehicle whereby the course of the vehicle is constantly indicated to the driver.

The invention comprises a compass with a mounting therefor capable of being applied to the wind shield of an automobile so that the indicating portion of the compass is constantly visible to the driver of the vehicle, and, furthermore, the arrangement may be such that a compass may be applied to or removed from the wind shield at will and may be readily stored in the pocket of the operator. The compass is so made as to be weather and dust proof and there is provision for maintaining the compass level even though the wind shield be tipped as is sometimes the case.

The invention will be best understood from a consideration of the following description taken in connection with the accompanying drawings forming part of this specification, with the further understanding that the invention is not confined to any strict conformity with the showing of the drawings but may be changed and modified so long as such changes and modifications are within the scope of the appended claims.

In the drawings

Figure 1 is a side elevation of the auto-compass of the invention applied to one glass of a wind shield, said glass being shown in section;

Fig. 2 is a front elevation of the structure shown in Fig. 1;

Fig. 3 is a top plan view of the compass omitting some parts;

Fig. 4 is a section on the line 4—4 of Fig. 2 but drawn on a larger scale;

Fig. 5 is a view similar to Fig. 1 but showing the wind shield glass tilted with the compass case horizontal;

Fig. 6 is a plan view of the dial and needle part of the compass;

Fig. 7 is an edge view of the structure shown in Fig. 6.

Referring to the drawings there is shown a cylindrical case 1 constituting the compass body and on a peripheral portion of the case is a window 2 including a glass pane 3 set in a frame 4 in any suitable manner to make it weather and dust proof.

The casing 1 may be of any desirable construction, but on account of the liability of exposure to weather and other conditions the casing should be both weather and dust-proof.

On what constitutes the bottom of the casing is an elongated boss 5 having a chamber 6 therein communicating with the interior of the casing. Extending from the chamber 6, which is near that side of the casing adjacent to the window 2, is a passage or channel 7 substantially parallel with the bottom of the casing and opening at the end remote from the chamber 6. The boss 5 may be conveniently made in one piece with the bottom of the casing or may be otherwise constructed as may be deemed desirable.

Within the casing and in alined relation with each other at the top and bottom of the casing respectively are bearings 8 and 9 for a pointed shaft 10. The bearings 8 and 9 are preferably jewel bearings so that the shaft 10 may be very accurately and delicately mounted. Carried by the shaft 10 near the lower jewel bearing 9 is a magnetized bar 11 arranged diametrically of the casing 1. The bar 11 carries a ring 12 which may be made of flat material set on edge and having displayed thereon indicia 13 representing the points of the compass. The ring 12 is of a translucent nature for a purpose which will hereinafter appear. The indicia on the responsive member of the compass are visible through the window 2 but the latter is sufficiently restricted in length to prevent more than one indicating mark from being seen at a time, especially when such mark is approximately central to the window.

On opposite sides of the boss 5 and arranged on an axis parallel with that diameter of the casing 1 which is perpendicular to the diameter of the casing central to the window 2, are trunnions 14. Secured to each trunnion 14 by a screw 15 is one end of a respective one of two arms 16, the other ends of the arms being secured to or formed in one piece with a plate 17 arranged at substantially right angles to the lengths of the arms 16, but such particular arrangement is not obligatory. The plate 17 extends from the arms 16 in a direction away from the casing 1. The plate 17 is made fast to a larger plate 18 which may extend not only lengthwise of the plate 17 but for a distance higher than the top of the compass casing 1 and is there bent into a clip or finger 19 shaped to straddle the upper edge of one of the glass panes 20 of a wind shield, such pane being the lower pane. The clip 19 has a free end so disposed that it may be made to engage the outer face of the glass 20 while a rubber or other elastic sheet 22 is secured to that face of the plate 18 toward the glass pane 20 whereby the whole device may be applied to the wind shield glass and will firmly hold its position thereon because of the frictional character of the rubber or other similar material and the pressure with which the rubber is held in engagement with the glass by the elasticity of the finger 21.

Within the passage 7 there is lodged a plug 23 which may be made of insulating material, and this plug projects at one end beyond the open end of the passage 7 and with the other end within the passage 7 and there carries a lamp socket 24 of the kind usually described as a miniature lamp socket, although any of the customary forms of lamp sockets adapted for the purpose may be employed. The lamp socket is provided with an electric lamp 25 capable of being energized by any suitable source of current, say by a battery or generator such as is usually provided on automobiles. The lamp bulb is so arranged as to be located within the chamber 6 and light from the lamp bulb is transmitted into the casing 1 through the opening where the chamber 6 merges into the interior of the casing 1, whereby the light furnished by the lamp illuminates the visible portion of the compass indicia so that the latter are visible through the window 2, the lamp being used for illumination at night. Should it be desired to consult the compass during the day-time this is accomplished by external light. The indicia and the ground on which they are produced may be of such contrasting character as to make the indicia clearly visible by daylight.

The plug 23 is rotatable to a limited degree within the passage 7 and such rotation is accomplished by means of an angle pin 26 fast on the plug and projecting through a recess 27 in the corresponding end of the boss 5. The recess has sloping walls 28 on opposite sides. When the pin 26 is central in the recess 27 it is out of engagement with either of the walls 28 but when the pin is moved to one side or the other against a wall 28 such sloping wall acts as a cam forcing the plug 23 a short distance longitudinally and the side portions of the recess are so made as to receive and retain the pin 26 holding it at one extremity or the other of its travel. Under these circumstances one side of the circuit of the lamp 25 may be through the socket 24 and by way of the pin 26, which may be electrically connected with the socket 24, to the boss 5 and thence by way of the metallic parts of the compass casing to the plate 17 and by way of a conductor 29 to the particular source of current employed. Fast to the plate 17 but insulated therefrom is a spring contact 30 so arranged as to engage a terminal 31 carried by the plug 23 and engaging the center contact of the lamp 25. The spring contact 30 may be connected by a conductor 32 to the source of electric energy already referred to.

The compass is capable of being rocked about the axis of its connection with the arms 16 but this does not interrupt the circuit of the lamp 25 because the contact 31 will maintain engagement with the spring contact 30 through a considerable extent of rocking of the compass. This arrangement permits the tilting of the wind shield 20 to as great a degree as is customary, such position of the parts being shown in Fig. 5. When the wind shield 20 is upright or when tilted the compass may be kept level and, therefore, will respond accurately to changes in the course of the vehicle and constantly indicate to the driver the course being traveled by the vehicle, this being a particularly valuable matter of information at night.

The window 2 is on that side of the compass casing remote from the front of the automobile so that the compass indicia are arranged oppositely from the customary practice in order that the driver of the vehicle may correctly read the indicia without effort, to ascertain the direction of travel.

What is claimed is:

1. The combination with an automobile, of a compass mounted adjacent to and in front of the operator's seat of the automobile and provided with a casing having a window directed rearwardly, said compass having a magnetized member mounted to turn on a substantially upright axis in response to earth magnetism, and an indicia carrier mounted on said magnetized member and having indicia displayed in substantially upright position through the rearwardly directed window.

2. A compass for automobiles having a casing with a circumscribed window through one side, a magnetized member in the casing mounted to turn, when in operative position, on a substantially upright axis, in response to earth magnetism, a support for the compass adapted to be attached to the automobile forward of the operator's seat thereof, and a carrier mounted on the magnetized member and provided with indicia fractionally visible through the window as the carrier turns and representing the cardinal points of the compass displaced about the axis of the magnetized member by substantially 180°.

3. A compass for automobiles having a casing of generally cylindrical form with a circumscribed window through its peripheral portion, a magnetized member mounted to turn, when in operative position, on a substantially upright axis, in response to earth magnetism, and a carrier of substantially cylindrical form mounted on said magnetized member in concentric relation to the upright axis and provided with indicia, fractionally visible through the window as the carrier turns and representing the cardinal points of the compass, in upright position and displaced by substantially 180° from the normal position of such points, whereby an observer viewing the indicia from the rear of the compass may directly read the compass indications correctly showing the direction of forward travel of the automobile.

4. A compass for automobiles provided with indicia representing the cardinal points of the compass arranged oppositely to the natural position and constantly holding such relation with reference to the magnetic member of the compass, and a casing inclosing the portion of the compass carrying the indicia and magnetic member and provided with a window of circumscribed area and of a size to exhibit one of the indicia at a time, whereby an observer facing the direction in which the automobile is headed reads the position of the automobile on that portion of the compass facing the observer.

5. A compass for automobiles comprising a casing with a window on one side of circumscribed area as compared to said side, a support for the casing attachable to an automobile to hold the window facing toward the rear of the automobile, and means responsive to earth magnetism and located within the compass casing and provided with indicia visible through the window and arranged to indicate the point of the compass toward which the automobile is headed.

6. A compass for automobiles, comprising a casing with means therein responsive to earth magnetism, said casing having a window on one side, an indicia carrier on the magnetically responsive means and arranged to be visible through the window to indicate the direction toward which the automobile is headed, and carrying means for the compass provided with holding means adapted to engage a wind shield glass of the automobile and so sustain the compass that the window thereof is directed rearwardly.

7. A compass for automobiles, comprising a casing with means therein responsive to earth magnetism, said casing having a window on one side, an indicia carrier on the magnetically responsive means and arranged to be visible through the window to indicate the direction toward which the automobile is headed, and carrying means for the compass provided with holding means adapted to engage a wind shield glass of the automobile and so sustain the compass that the window thereof is directed rearwardly, the compass and its holding means having a jointed connection for permitting tipping of the wind shield and the maintenance of the compass in a substantially level position.

8. A compass for automobiles provided with a casing having a window at one side, a compass member within the compass casing mounted to respond to earth magnetism, an indicia carrier on the magnetically responsive member, and means for directing light through the indicia carrier where provided with indicia for illuminating the indicia for observation thereof through the window.

9. A compass for automobiles provided with a casing having a window at one side, a compass member within the casing mounted to respond to earth magnetism, a cylindrical indicia carrier on the magnetically responsive member, and means for directing light through the walls of the indicia carrier where provided with indicia for illuminating the indicia for observation thereof through the window.

10. A compass for automobiles provided with a casing having a window at one side, a compass member within the casing mounted to respond to earth magnetism, a cylindrical indicia carrier on and movable with the magnetically responsive member and transmissible of light through its walls, and means for directing light against the inner wall of the indicia carrier where opposite the window for the transmission of the light through the carrier to the window.

11. A compass for automobiles provided with a casing having a window at one side, a compass member within the casing mounted to respond to earth magnetism, a cylindrical indicia carrier on and movable with the magnetically responsive member, means for illuminating the interior of the indicia carrier for transmission of the light through the indicia carrier, where provided with indicia, to and through the window, means on the casing for supporting it from a part of the automobile with the casing and supporting means pivoted together, and the light-giving means comprising an electric lamp with connections between the lamp and the casing support for maintaining electrical contact when the casing and support are in tipped relation one to the other.

12. A compass for automobiles comprising a casing, a rotatable member therein responsive to earth magnetism, and an indicia carrier with indicia thereon in concentric relation to the axis of rotation of the rotatable member and fast to and movable with said rotatable member, the casing being provided on one side of the axis of rotation of the rotatable member with a window and on the opposite side with means for attaching the casing to a part of the automobile forward of the operator's seat, with the window at a height corresponding to the line of sight of the operator, whereby the indicia is visible to the operator through the window at the rear side of the casing.

13. A compass for automobiles comprising a casing with a window at one side, a support for the casing on the side thereof remote from the window for attachment of the casing to the wind shield of the automobile, a pivot connection between the casing and support for accommodating the compass to tipping of the wind shield, a magnetic member in the casing responsive to earth magnetism, and an indicia carrier mounted on the magnetically responsive member in position to be visible through the window to a person facing toward the front of the automobile.

14. A compass for automobiles comprising a casing with a window at one side, a support for the casing on the side thereof remote from the window for attachment of the casing to the wind shield of the automobile, a pivot connection between the casing and support for accommodating the compass to tipping of the wind shield, a magnetic member in the casing responsive to earth magnetism, and an indicia carrier mounted on the magnetically responsive member in position to be visible through the window to a person facing toward the front of the automobile, the indicia carrier being of cylindrical contour with compass indicia arranged on the outer face of the carrier, in opposite order to the natural position of such indicia in a compass.

In testimony that I claim the foregoing as my own I have hereto affixed my signature in the presence of two witnesses.

CHARLES D. McCONNELL.

Witnesses:
    J. W. LOFFELTEN,
    JOHN McCUTCHEON.